(12) United States Patent
Sakamoto

(10) Patent No.: US 6,857,781 B1
(45) Date of Patent: Feb. 22, 2005

(54) ROTOR BEARING WITH PROPELLER FOR INCREASED LUBRICANT FLOW

(75) Inventor: Stephen M. Sakamoto, Oklahoma City, OK (US)

(73) Assignee: Wood Group ESP. Inc., Oklahoma City, OK (US)

(*) Notice: Subject to any disclaimer, the term of this patent is extended or adjusted under 35 U.S.C. 154(b) by 218 days.

(21) Appl. No.: 10/353,550

(22) Filed: Jan. 29, 2003

(51) Int. Cl.⁷ ............................................... F16C 17/02
(52) U.S. Cl. ...................................................... 384/114
(58) Field of Search ................................ 384/114, 118, 384/107, 111, 100

(56) References Cited

U.S. PATENT DOCUMENTS

| | | |
|---|---|---|
| 4,453,099 A | 6/1984 | Flat |
| 4,513,215 A | 4/1985 | Del Serra |
| 4,521,708 A | 6/1985 | Vandevier |
| 5,128,573 A | 7/1992 | Liu et al. |
| 5,189,328 A | 2/1993 | Knox |
| 5,713,670 A | 2/1998 | Goldowsky |
| 5,828,149 A | 10/1998 | Parmeter et al. |
| 6,091,175 A | 7/2000 | Kinsinger |
| 6,099,271 A | 8/2000 | Brookbank |
| 6,109,790 A | 8/2000 | von Gynz-Rekowski et al. |
| 6,225,720 B1 | 5/2001 | Desta |
| 6,250,806 B1 | 6/2001 | Beshoory |

*Primary Examiner*—Lenard A. Footland
(74) *Attorney, Agent, or Firm*—Crowe & Dunlevy, P.C.

(57) ABSTRACT

A pumping system is provided that includes a pump assembly and a motor assembly. The motor assembly has a bearing collar and a bearing sleeve concentric to the bearing collar. Preferably, the bearing sleeve includes at least one propeller blade that is configured to assist the movement of lubricant through the motor assembly. In another preferred embodiment, the motor includes a lubricant channel housed within a centrally located shaft. Lubricant is moved out of the lubricant channel through a shaft port and a blade port disposed in the propeller blade.

19 Claims, 5 Drawing Sheets

PRIOR ART

ROTOR BEARING WITH PROPELLER FOR INCREASED LUBRICANT FLOW

FIELD OF THE INVENTION

This invention relates generally to the field of rotor bearings for motors, and more particularly, but not by way of limitation, to a motor bearing assembly for an electric motor.

BACKGROUND

Submersible pumping systems are often deployed into wells to recover petroleum fluids from subterranean reservoirs. Typically, the submersible pumping system includes a number of components, including one or more electric motors coupled to one or more high performance centrifugal pumps. Each of the components in a submersible pumping system must be engineered to withstand the inhospitable downhole environment.

Like conventional motors, submersible motors typically operate by using a "stator" to create a series of moving electromagnetic fields that cause a ferromagnetic "rotor" to spin about a fixed axis. In submersible motors, the stators usually surround the rotors, which are secured to a center shaft that is used to transfer the output of the motor. In this way, the rotor and shaft spin about a common axis inside the motionless stator.

Submersible motors can vary in length from a few feet to nearly one hundred feet and may be rated up to hundreds of horsepower. In longer submersible motors, it may be desirable to employ a number of separate rotor sections within a single stator. Each rotor section is usually constructed from a number of thin pieces of material, or laminations, that are held in place by electrically conductive rods inserted through openings in the laminations. The shaft can be secured within the inner diameter of the rotor sections with a keyed connection or by one of several other well-known methods.

Bearing assemblies are typically placed between adjacent rotor sections to center the rotor and shaft within the stator. Most rotor bearing assemblies include a bearing sleeve that rotates in close proximity with a surrounding bearing collar. The bearing sleeve is typically fixed to the motor's shaft and the bearing collar is fixed in a stationary condition to the stator. In most submersible motors, the rotor bearing assemblies are "hydrodynamic," and rely on the presence of a thin film of lubricant in the annulus between the bearing sleeve and bearing collar.

In some prior art designs, lubricant is pumped into the annulus between the bearing sleeve and bearing collar by the centrifugal force generated by the spinning shaft and bearing sleeve. Lubricant is supplied to the bearing sleeve through a hollow channel in the motor shaft that is connected to a lubricant reservoir. Linearly aligned ports in the shaft and bearing sleeve deliver the lubricant from the hollow channel in the shaft to the annulus between the bearing sleeve and collar. The lubricant then flows into the spaces between the rotor sections and the stator, thereby protecting these components. Because the annulus between the sleeve and collar is typically small, some prior art designs include longitudinal passages through the bearing collar that improve the flow of lubricant across the bearing assembly.

Figure 1:
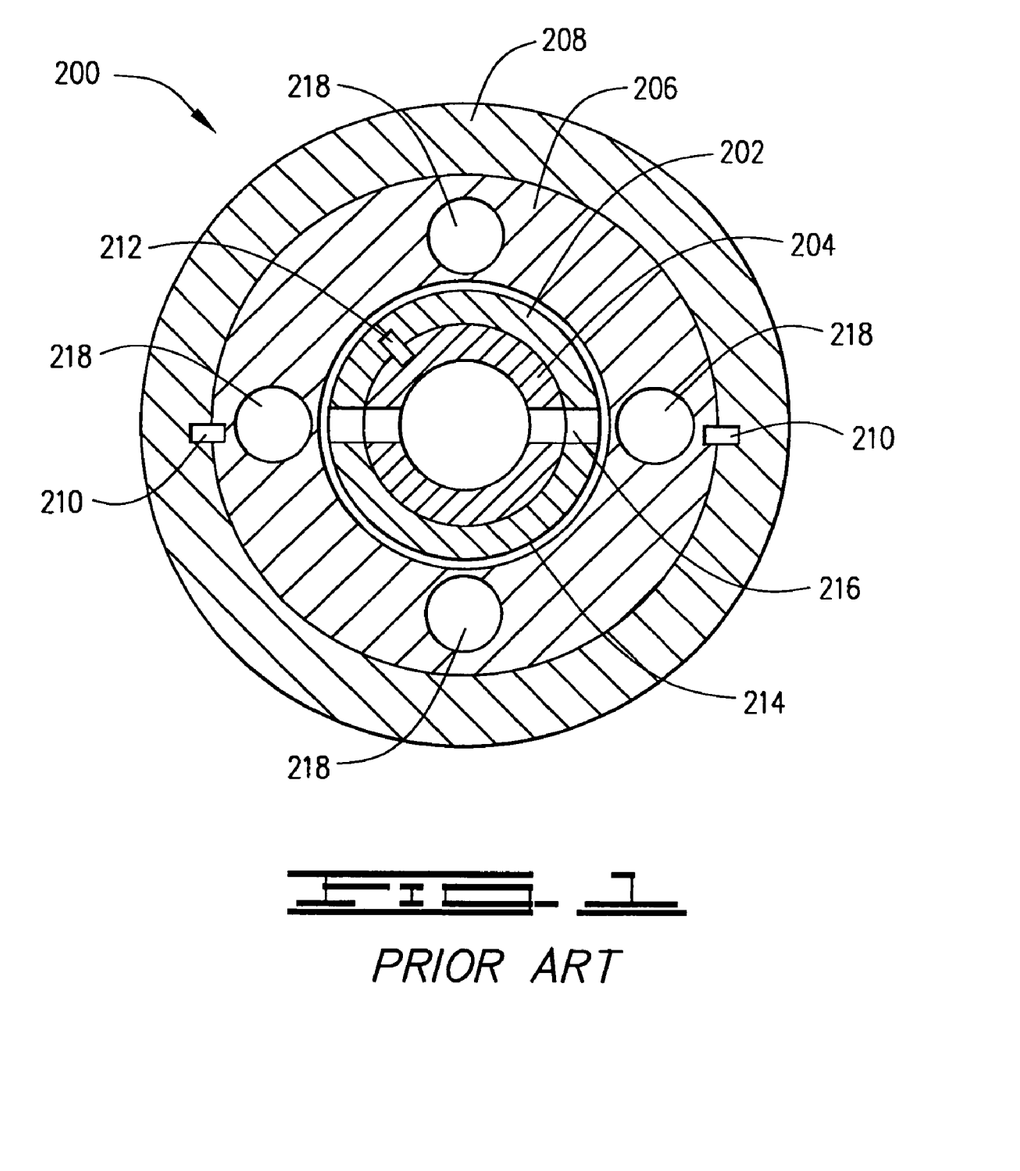
FIG. 1 is a top cross-sectional view of a prior art bearing assembly and motor shaft.

By way of illustration, FIG. 1 shows a prior art rotor bearing assembly 200 that includes a rotor bearing sleeve 202 that is secured to a hollow shaft 204 and a rotor bearing collar 206 that is attached to the stator 208. The rotor bearing sleeve 202 may be secured to the shaft 204 and the bearing collar 206 to the stator 208 by any of a number of well known methods, such as keyed connections 210 and 212. An oil-filled annulus 214 occupies the space between the bearing sleeve 202 and bearing collar 206. As the bearing sleeve 202 and shaft 204 rotate, lubricant is drawn out of the shaft 204 and pushed into the annulus 214 through a port 216. In this way, the bearing sleeve 202 and shaft 204 propel lubricant from the shaft 204 into the annulus 214 through the port 216. Passages 218 extend through the bearing collar 206 and permit the increased flow of lubricant through the bearing assembly 200.

As motors continue to increase in speed and power, the need for effective lubrication also increases. Although effective to a limited degree, prior art rotor bearings fail to circulate sufficient quantities of lubricant to satisfy the demands of next generation motors. Without sufficient lubrication, the moving components of the submersible motor can become worn and result in mechanical or electrical failure. Failure of the components in the motor can result in expensive repairs and work stoppages. Cost savings can be realized with motors that last longer and incur minimal downtime.

There is therefore a continued need for improving the lubrication of submersible motors. It is to these and other deficiencies in the prior art that the present invention is directed.

SUMMARY OF THE INVENTION

In a preferred embodiment, the present invention provides a pumping system that includes a pump assembly and a motor assembly. The motor assembly has a bearing collar and a bearing sleeve concentric to the bearing collar. Preferably, the bearing sleeve includes at least one propeller blade that is configured to assist the movement of lubricant through the motor assembly. In another preferred embodiment, the motor includes a lubricant channel housed within a centrally located shaft. Lubricant is moved out of the lubricant channel through a shaft port and a blade port disposed in the propeller blade.

These and various other features and advantages that characterize the present invention will be apparent from a reading of the following detailed description and a review of the associated drawings.

BRIEF DESCRIPTION OF THE DRAWINGS

FIG. 6 is an elevational partial cross-sectional view of a portion of the motor assembly of FIG. 2.

DETAILED DESCRIPTION OF THE PREFERRED EMBODIMENT

Figure 2:
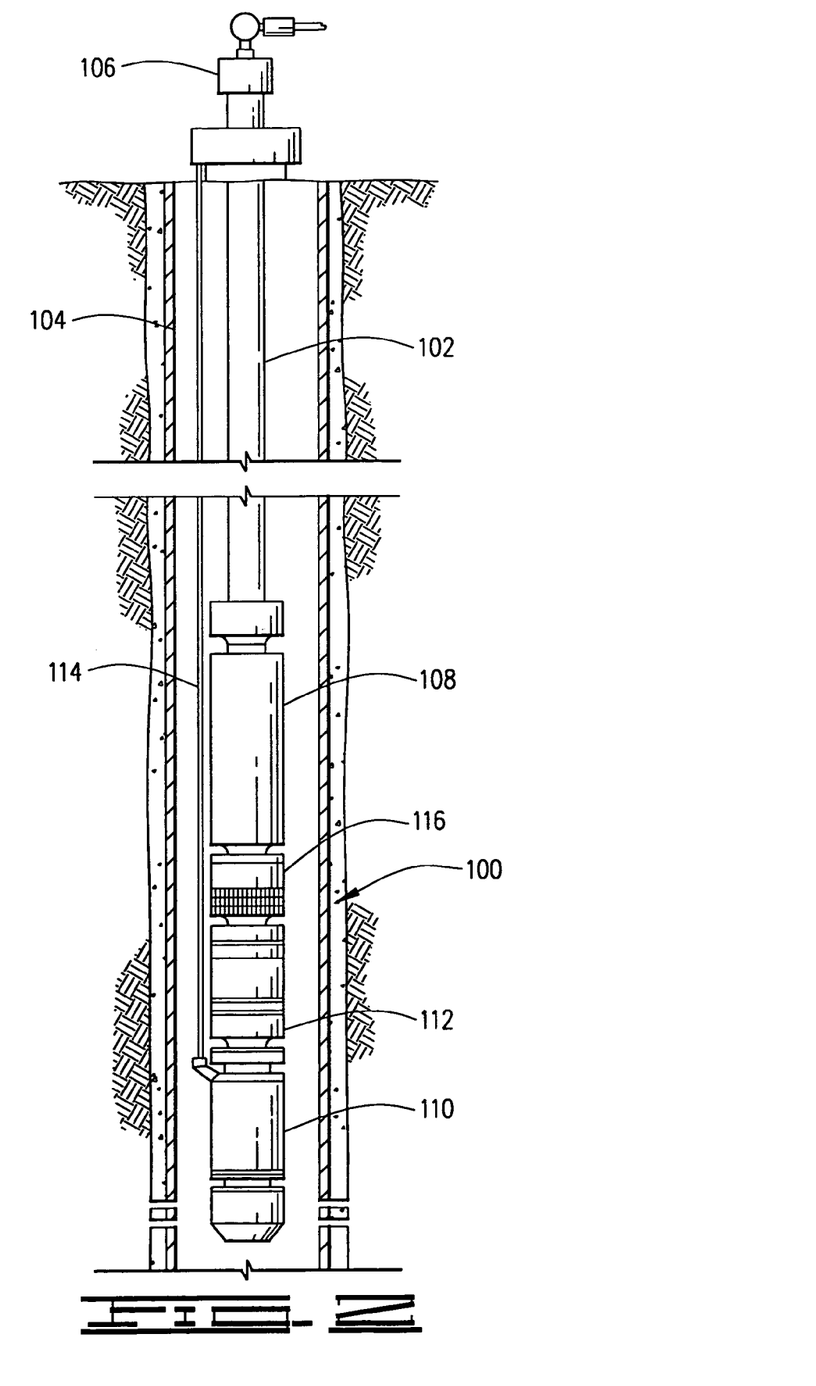
FIG. 2 is an elevational view of an electric submersible pumping system disposed in a wellbore constructed in accordance with a preferred embodiment of the present invention.

In accordance with a preferred embodiment of the present invention, FIG. 2 shows an elevational view of a pumping system 100 attached to production tubing 102. The pumping system 100 and production tubing are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface.

The pumping system 100 preferably includes some combination of a pump assembly 108, a motor assembly 110 and a seal section 112. The seal section 112 shields the motor assembly 110 from mechanical shock produced by the pump assembly 108 and ingress of fluids produced by the well. The motor assembly 110 is provided with power from the surface by a power cable 114.

Although only one pump assembly 108 is shown, it will be understood that more than one pump assembly 108 can be connected when appropriate. The pump assembly 108 is preferably fitted with an intake section 116 to allow well fluids from the wellbore 104 to enter the pump assembly 108. The intake section 116 has openings to allow the well fluid to enter the pump assembly 108, where the well fluid is forced to the surface through the production tubing 102.

Figure 3:
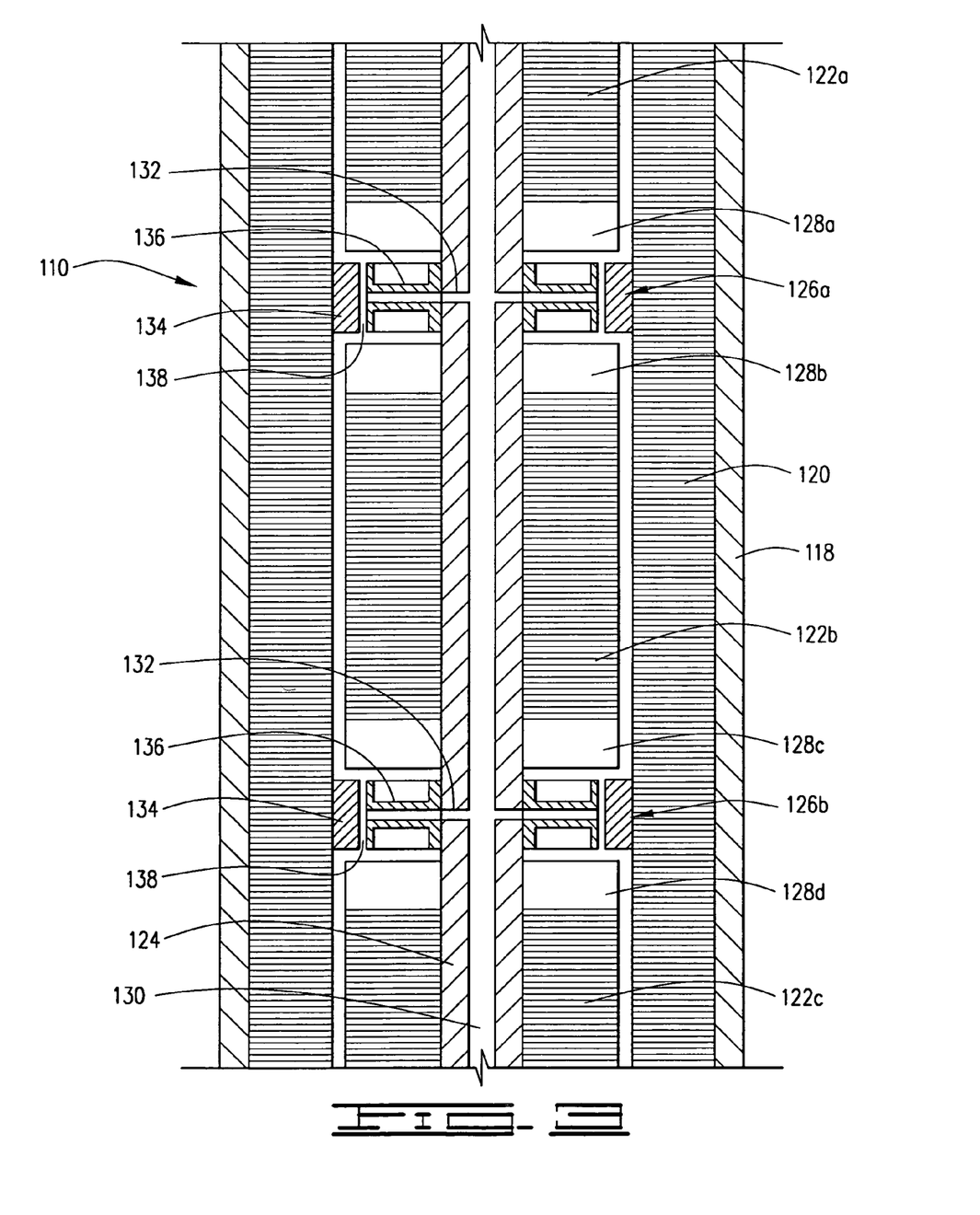
FIG. 3 is an elevational partial cross-sectional view of a portion of the motor assembly of the submersible pump of FIG. 2.

Referring now to FIG. 3, shown therein is an elevational cross-sectional view of a portion of the motor assembly 110. The motor assembly 110 generally includes a motor housing 118, a stator assembly 120, one or more rotor assemblies 122 (separately designated as 122a, 122b and 122c), a shaft 124 and bearing assemblies 126 (separately designated as 126a and 126b). The structure and interrelated function of each of these components is discussed below.

The motor housing 118 is preferably cylindrical and fabricated from a durable, anti-corrosive material. The motor housing 118 encompasses and protects the internal portions of the motor assembly 110 and preferably eliminates the entry of well fluids into the motor assembly 110. In certain applications, it is preferred that the motor housing 118 be fitted with flanges or other adapters for connection to adjacent downhole components.

Adjacent the motor housing 118 is a stationary stator assembly 120 that remains fixed in position adjacent the motor housing 118. The stator assembly 120 is preferably constructed from a plurality of circular laminations (not separately designated) that are aligned and stacked under compression. Windings (not shown) between the laminations are used to conduct electricity through the stator assembly 120. As is known in the art, electricity flowing through the stator assembly 120 according to predefined commutation states creates a rotating magnetic field.

Although three rotor assemblies 122 are shown in FIG. 3, it will be understood that the number and configuration of rotor assemblies 122 can vary depending on the particular requirements of the motor assembly 110. For example, several differently sized rotor assemblies 122 can be used within a single motor assembly 110. Like the stator assembly 120, the rotor assemblies 122 preferably include a plurality of laminations (not separately designated) that are aligned and stacked.

Each rotor assembly 122 also includes conductive rotor bars (not shown) that extend axially between opposing end rings 128 (individually designated as 128a, 128b, 128c and 128d). The conductive rotor bars are constructed and configured to cause the rotor assembly 122 to rotate in response to the moving magnetic fields produced by the stator assembly 120. The end rings 128 are used to retain the rotor bars, compress the laminations, conduct the current flowing between the rotor bars and support the weight of the rotor assembly 120 on a thrust washer or support ring (not shown).

The shaft 124 extends substantially the length of the motor assembly 110 and transfers the motion generated by the motor assembly 110 to the pump assembly 108. The shaft 124 includes an axially oriented lubricant channel 130 that is connected to a motor lubricant reservoir (not shown) at the bottom of the motor assembly 110. The lubricant channel 130 is configured to permit the flow of motor lubricant from the lubricant reservoir through the shaft 124. The shaft 124 also includes one or more shaft ports 132 that extend radially from the lubricant channel 130 to the outer diameter of the shaft 124.

Also shown in FIG. 3 are two bearing assemblies 126 (individually designated as 126a and 126b). The bearing assemblies 126 each include a bearing collar 134 and a bearing sleeve 136. An annulus 138 is formed between the outer edge of the bearing sleeve 136 and the inner edge of the bearing collar 134. During use, the annulus 138 contains fluid that serves as a hydrodynamic film between the bearing sleeve 136 and bearing collar 134. The bearing collars 134 are secured to the stator assembly 120 by a keyed connection (not shown) or any of several other methods known in the art. Likewise, the bearing sleeves 136 are secured to shaft 124 using any of several methods known in the art such as a keyed connection or shrink fitting.

Figure 4:
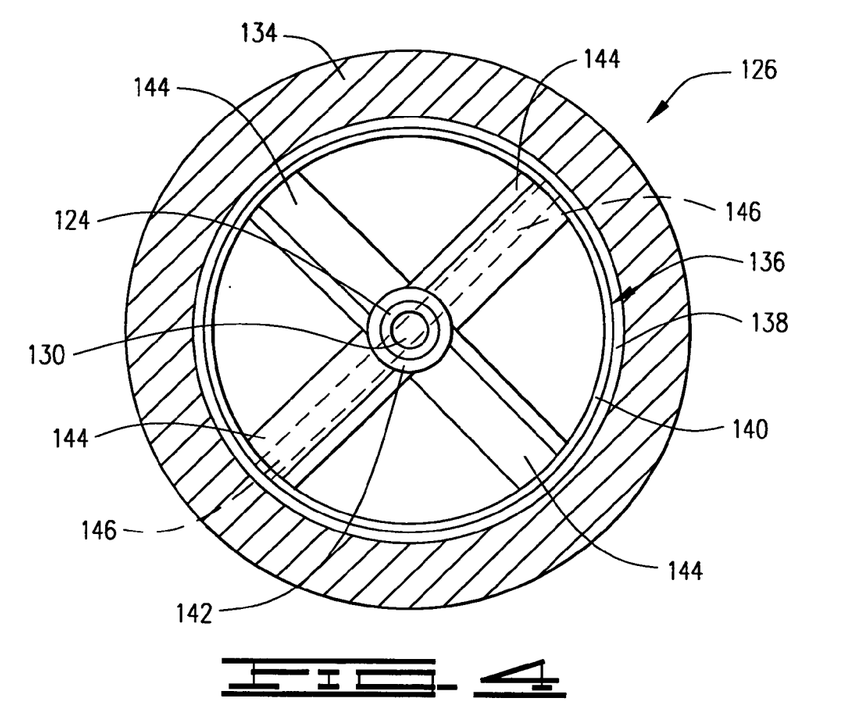
FIG. 4 is a top plan view of a first preferred embodiment of the rotor bearing assembly of the motor assembly of FIG. 2.

FIG. 4 provides a top view of the bearing assembly 126 constructed in accordance with a presently preferred embodiment. In the presently preferred embodiment, the bearing sleeve 136 is shown with a greater radial thickness than the bearing collar 134. It will be understood, however, that alternative geometric relationships between the bearing sleeve 136 and bearing collar 134 are encompassed within the scope of the present invention. For example, the radial thickness, expressed as the difference between outer and inner edge of the bearing collar 134, could be larger than the radial thickness of the bearing sleeve 136.

Figure 5:
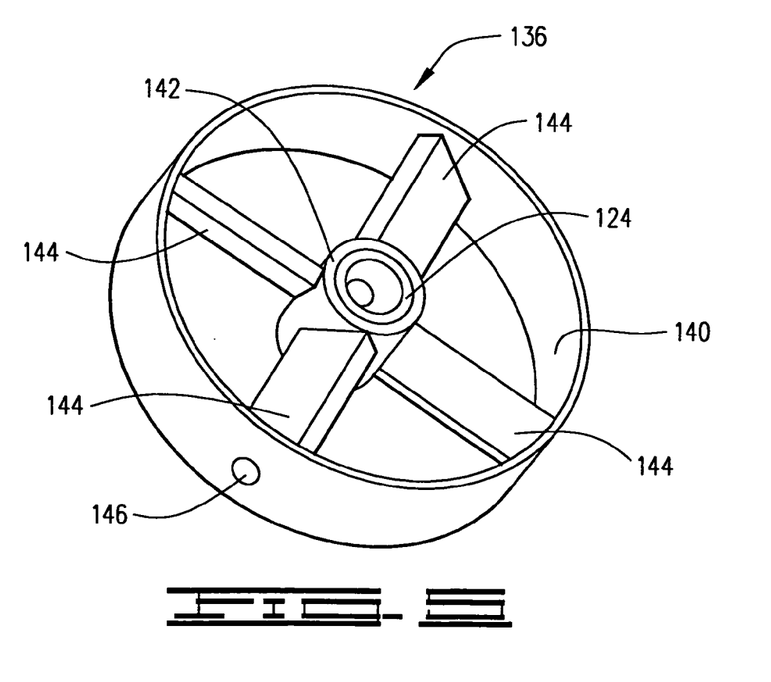
FIG. 5 is a perspective view of the preferred embodiment of the rotor bearing sleeve of FIG. 4.

Now referring also to FIG. 5, shown therein is a perspective view of the bearing sleeve 136 of the bearing assembly 126. The bearing sleeve 136 preferably includes a nm 140, a hub 142 and at least one propeller blade 144. The rim 140 and hub 142 are connected to the distal and proximal ends of the blade 144, respectively. The blade 144 is preferably "pitched" to enable the propulsion of fluids across the bearing sleeve 136 during operation. In this way, the bearing sleeve 136 acts as a propeller during operation that imparts energy to motor lubricant as it migrates through the motor assembly 110.

Although four blades 144 are shown, it will be understood that greater or fewer numbers of blades 144 could be used in alternative embodiments. Furthermore, although the blades 144 are depicted as substantially box-shaped, it will be understood that alternative blade configurations are also contemplated by the present invention. For example, in certain alternative embodiments, it may be desirable to employ curved or segmented blades.

As shown in FIGS. 4 and 5, two of the blades 144 include blade ports 146 (shown in dashed lines) that extend radially from the inner diameter of the hub 142 through the outer diameter of the rim 140. Preferably, the blade ports 146 are linearly aligned with the shaft ports 132. Accordingly, as the bearing sleeve 136 rotates with the shaft 124, lubricant is capable of moving from the lubricant channel 130 into the annulus 138 through the shaft ports 132 and blade ports 146.

Although two blade ports 146 are presently preferred as shown in FIG. 4, it will be understood that fewer or greater numbers of blade ports 146 can be used with equal success. For example, it may be desirable to include blade ports 146 in all of the blades 144. In other embodiments, it may be desirable to employ bearing assemblies 126 that do not include blade ports 146. Such bearing assemblies 126 are configured to increase the flow of lubricant through the motor assembly 110 without drawing additional lubricant into the annulus 138 from the lubricant channel 130.

Additionally, in certain applications it may be desirable to employ hub ports (not shown in FIG. 4) that extend only through the hub 142 into the space between adjacent blades 144. In these applications, the lubricant will travel from the lubricant channel 130 into the spaces between adjacent blades 144 through the shaft ports 132 and hub ports. It will be understood that combinations of hub ports and blade ports 146 can be successfully used and are encompassed within the scope of the present invention.

FIG. 6 shows an elevational partial cross-sectional view of a portion of a motor assembly 110 constructed in accordance with a preferred embodiment of the present invention. Lubricant flow paths are indicated with arrows to show the migration of the lubricant throughout the motor assembly 110. As the bearing sleeves 136 rotate, lubricant is drawn into the blade ports 146 out of the lubricant channel 130. The spinning blade ports 146 impart energy to the lubricant, which is forced out of the bearing sleeve 136 into the annulus 138 adjacent the bearing collar 134.

As the lubricant flows out of the bearing sleeve 136, additional lubricant is drawn up the shaft 124 in response to the pressure gradient in the lubricant channel 130. It will be understood that lubricant which does not exit the lubricant channel 130 at bearing ports 138 continues migrating upward and exits the shaft 124 at an upper bearing sleeve or alternative outlet (not shown).

At the same time, lubricant flowing between adjacent rotor sections 122 is energized as it passes through the bearing assemblies 126. As the blades 144 turn with the shaft 124, lubricant travels through the bearing assemblies 126 and forced into adjacent rotor sections 122. In this way, the bearing assemblies 126 increase the volumetric flowrate of lubricant through the motor assembly 110.

After flowing between the rotor assemblies 122, stator assembly 120 and bearing assemblies 126, the lubricant flows back to the bottom of the motor assembly 110. A reservoir (not shown) can be used to store lubricant before re-circulation. The lubricant is preferably filtered before returning to the hollow lubricant channel 130 for continued circulation.

The lubricant flow paths and motor assembly 110 have been set forth above for the purposes of disclosing preferred embodiments of the rotor bearing assembly 126. It will be understood, however, that the rotor bearing assembly 126 can be configured to provide alternate lubricant flow paths within the motor assembly 110. Furthermore, it will also be understood that the bearing assembly 126 can be used in motors that are configured differently than motor assembly 110. For example, the bearing assemblies 126 can be configured to push the lubricant up through the motor assembly 110. In such an embodiment, the shaft 124 could act as a return path for the lubricant. Additionally, although preferred embodiments are disclosed herein with reference to a submersible pumping system 100, it will be understood that these embodiments also find utility in non-submersible applications, such as surface-based horizontal pumping systems.

In accordance with one aspect of a preferred embodiment, the present invention provides an apparatus for increasing the flow of lubricant in a motor, thereby increasing the motor's operating life. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A hydrodynamic bearing assembly comprising:
   a bearing collar; and
   a bearing sleeve concentric to the bearing collar, wherein the bearing sleeve includes at least one propeller blade.

2. The bearing assembly of claim 1, wherein the propeller blade is pitched.

3. The bearing assembly of claim 1, wherein the bearing assembly further comprises a blade port disposed within the propeller blade.

4. The bearing assembly of claim 1, wherein the bearing sleeve includes a hub connected to a proximal end of the propeller blade and a rim connected to the distal end of the propeller blade.

5. The bearing assembly of claim 4, wherein the bearing sleeve includes a hub port that extends laterally through the hub.

6. A pumping system comprising:
   a pump assembly; and
   a motor assembly, wherein the motor assembly comprises:
      a bearing collar; and
      a bearing sleeve concentric to the bearing collar, wherein the bearing sleeve includes at least one propeller blade.

7. The bearing assembly of claim 6, wherein the propeller blade is pitched.

8. The bearing assembly of claim 6, wherein the bearing assembly further comprises a blade port disposed within the propeller blade.

9. The bearing assembly of claim 6, wherein the bearing sleeve includes a hub connected to a proximal end of the propeller blade and a rim connected to the distal end of the propeller blade.

10. The bearing assembly of claim 9, wherein the bearing sleeve includes a hub port that extends laterally through the hub.

11. A motor assembly for use in pumping systems, comprising:
   a shaft;
   a rotor assembly secured to the shaft;
   a stator assembly proximate the rotor assembly; and
   a bearing assembly secured to the shaft, wherein the bearing assembly comprises:
      a bearing collar; and a bearing sleeve concentric to the bearing collar, wherein the bearing sleeve includes at least one propeller blade.

12. The motor assembly of claim 11, wherein the shaft has a lubricant channel and a shaft port.

13. The motor assembly of claim 11, wherein the propeller blade is pitched to provide increased fluid propulsion characteristics.

14. The motor assembly of claim 11, wherein the bearing collar has a collar inner diameter and the bearing sleeve has a bearing outer diameter, and wherein the difference between the bearing sleeve outer diameter and the collar inner diameter forms an annulus.

15. The motor assembly of claim 13, wherein the bearing sleeve further comprises a blade port disposed within the propeller blade, wherein the blade port is connected to the shaft port to enable the movement of lubricant from the lubricant channel to the annulus.

16. The motor assembly of claim 12, wherein the blade has a proximal end and a distal end, and wherein the bearing sleeve further comprises:

a hub connected to the proximal end of the blade; and
a rim connected to the distal end of the blade.

17. The motor assembly of claim 16, wherein the bearing sleeve includes a hub port that is connected to the shaft port, wherein the hub port extends through the hub at a location not occupied by a propeller blade.

18. A bearing assembly for use in a submersible motor having a shaft and a stator, the bearing assembly comprising:

a bearing collar connected to the stator;
a bearing sleeve connected to the shaft and concentric to the bearing collar; and
means for moving lubricant through the motor.

19. The bearing assembly of claim 18, wherein the shaft includes a lubricant channel and the difference between the inner diameter of the bearing collar and the outer diameter of the bearing sleeve forms an annulus, wherein the bearing assembly further comprises:

means for moving lubricant from the lubricant channel to the annulus.

* * * * *

UNITED STATES PATENT AND TRADEMARK OFFICE
CERTIFICATE OF CORRECTION

PATENT NO. : 6,857,781 B1
DATED : February 22, 2005
INVENTOR(S) : Stephen M. Sakamoto It is certified that error appears in the above-identified patent and that said Letters Patent is hereby corrected as shown below:

Column 4,
Line 45, replace "nm" with -- rim --.

Signed and Sealed this

Thirtieth Day of August, 2005

JON W. DUDAS
*Director of the United States Patent and Trademark Office*